Aug. 29, 1939.    A. D. JULIUS    2,171,339
CONTAINER FOR ROUGE AND THE LIKE
Filed Nov. 2, 1938

INVENTOR.
Arthur D Julius
BY
David J Vincent
ATTORNEY.

Patented Aug. 29, 1939

2,171,339

UNITED STATES PATENT OFFICE 2,171,339

CONTAINER FOR ROUGE AND THE LIKE

Arthur D. Julius, New York, N. Y., assignor to Miner's, Inc., New York, N. Y., a corporation of New York Application November 2, 1938, Serial No. 238,361

6 Claims. (Cl. 132—79)

This invention relates to containers for rouge or the like, which incorporate an applicator unit and which are assembled when not in use in a compact manner and disassembled for use in a novel manner.

Broadly, it is an object of this invention to provide in a container for rouge or the like, in conjunction with a casing carrying rouge or the like in stick or paste form, an applicator carried in the cover for the casing and adapted for reciprocation within said cover.

Specifically, it is an object of this invention to provide in conjunction with a casing carrying rouge or the like in stick or paste form of a cover for such casing incorporating an applicator formed of felt or like material, the same being displaceable from inoperative to operative position with respect to said cover, to permit exposure and use theref; said applicator being displaceable to its normal unexposed position upon disposing the cover over the casing to close the same.

Another object of this invention is to provide a novel combination of a cover and applicator for a container for rouge or the like in which the applicator element is slidable in the cover element to permit exposure thereof for use and in which the applicator element forms a wall of the cover element to complete its function as a cover for the container.

I do not wish to be limited by the exact disclosure as described and shown in this specification and drawing, but mean all equivalents as may properly fall within the scope of the appended claims to be included.

Figure 1:
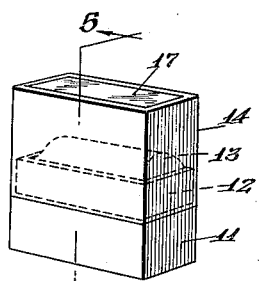
Figure 1 shows a perspective view of the container, applicator and cover in closed position with parts of the interior structure shown in dotted lines.
Figure 2:
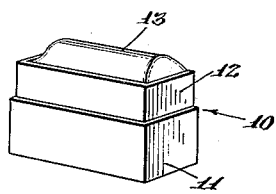
Figure 2 shows a perspective view of the container for rouge or the like with the cover removed.
Figure 3:
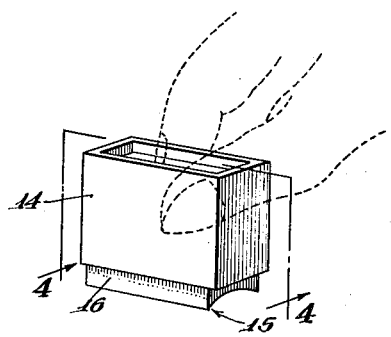
Figure 3 shows a perspective view of the cover and applicator showing the manner of operation of the applicator to its extended position for use.
Figure 4:
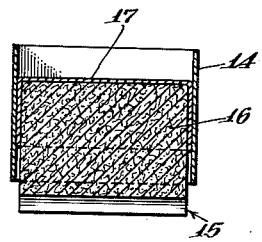
Figure 4 shows a sectional view taken on the line 4—4 of Figure 3.
Figure 5:
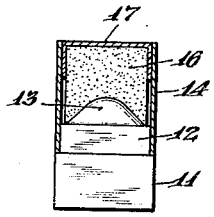
Figure 5 shows a section view taken on the line 5—5 of Figure 1 (with a portion shown in elevation).

The casing 10 for containing the rouge or other substance is illustrated in the representative drawing as being oblong or box-like in shape. Any other suitable shape may be used without departing from the invention as disclosed hereinafter. The casing 10 is constructed of stepped portions 11 and 12; the portion 12 forming a guide for a cover, to be later described, and the rim of the portion 11 forming a seat for the cover. The rouge or other substance 13 extends above the guide forming portion 12. The cover for this casing is a composite structure comprising an open ended oblong cover box 14 and an applicator structure generally designated as 15, which is slidably mounted within the cover box 14. The applicator proper is composed of any suitable felt-like or padded material 16 which is set in a base portion 17. This base portion fits tightly and, at the same time, slidably within the open ended cover box 14, thereby facilitating the sliding action of the applicator within the cover box. The portion 17 acts to close one end of the cover box in such manner that in the closed position (Figs. 1 and 5) it is flush with the top of the cover box and completes the cover structure. Upon removal of the cover structure, the applicator may be pushed out by a finger ready for use (Figure 3). After use upon closing of the rouge casing the applicator is forced back into the cover box by its contact with the rouge or like substance and eventually attains the positions shown in Figures 1 and 5. In this seated position, it is to be noted, the other end of the cover box seats on the rim of part 11.

It will be noted that the cover box is telescopically slidable over the applicator towards its seating position. When the cover is removed, however, the applicator is slidable within the cover box in order to bring it into position for use.

The cover box and applicator structure combine to form the completed cover for the rouge casing. The part 17 of the applicator structure functions as an end wall of the cover box to complete the cover for the casing.

It will be understood that any other substance may be contained in the casing 10 as, for example, solid paste and powdered materials.

In use, the rouge or other substance may be applied by the applicator or it may be directly applied by holding the casing 10. In the latter case the substance may be spread or the excess removed by the applicator.

It is obvious that various changes and modifications may be made to the details of construction without departing from the general spirit of the invention as set forth in the appended claims.

I claim:

1. In a device of the class described, a casing containing rouge or the like, a cover for said casing to cover the exposed portion of the said rouge or the like, an applicator slidably mounted in said cover, one end of said applicator forming a wall of said cover.

2. In a device of the class described, a casing containing rouge or the like, an applicator normally covering the exposed surface of the rouge or the like when not in use, a cover surrounding said applicator and slidable relative thereto for covering said casing.

3. In a device of the class described, a casing containing rouge or the like, an applicator normally covering the exposed surface of the rouge or the like when not in use, said applicator and said casing being in a fixed relation to each other when in closed position, a cover for said casing surrounding said applicator and said casing and slidable relative to both.

4. In a device of the class described, a casing containing rouge or the like, an applicator normally covering the exposed surface of the rouge or the like, an open ended telescoping covering member for said casing surrounding said applicator and said casing, said casing serving to close one end of said telescoping member and said applicator serving to close the other end of said telescoping member.

5. In a device of the class described, a casing containing rouge or the like, a cover for said casing to cover the exposed portion of said rouge or the like, an applicator slidably mounted in said cover, and normally contacting said rouge or the like when in the closed position, said covering being open at its end and said applicator functioning to close said open end.

6. In a device of the class described, a casing containing rouge or the like, a cover for said casing to cover the exposed portion of said rouge or the like, said cover comprising an open ended box-like member, an applicator slidable within said member and forming an end wall therefor.

ARTHUR D. JULIUS.